United States Patent [19]
Schäfer et al.

[11] Patent Number: 5,489,189
[45] Date of Patent: Feb. 6, 1996

[54] TURBO-ENGINE HAVING A VARIABLE PITCH PROPELLER

[75] Inventors: Horst Schäfer, Rhade; Günter Schaaf, Bremen; Günter Feldle, Ostfildern, all of Germany

[73] Assignee: KSB Aktiengesellschaft, Frankenthal, Germany

[21] Appl. No.: 200,246

[22] Filed: Feb. 23, 1994

[30] Foreign Application Priority Data

Feb. 27, 1993 [DE] Germany .......................... 43 06 131.1

[51] Int. Cl.⁶ ....................................................... F03B 3/06
[52] U.S. Cl. ............................................ 415/129; 415/155
[58] Field of Search ............................ 415/129; 416/155, 416/159, 160, 162

[56] References Cited

U.S. PATENT DOCUMENTS

| | | | |
|---|---|---|---|
| 2,231,343 | 2/1941 | Mader | 416/160 |
| 2,525,708 | 10/1950 | Morris | 416/155 |
| 2,949,540 | 8/1960 | Clayton . | |

FOREIGN PATENT DOCUMENTS

| | | |
|---|---|---|
| 1166957 | 6/1958 | France . |
| 1439216 | 4/1966 | France . |
| 2508560 | 6/1981 | France . |
| 1061260 | 1/1958 | Germany . |
| 2250473 | 10/1972 | Germany . |
| 0197499 | 11/1983 | Japan .................................... 415/129 |
| 59-176498 | 10/1984 | Japan . |
| 0006077 | 1/1985 | Japan .................................... 415/129 |
| 236091 | 5/1945 | Switzerland . |
| 513032 | 12/1970 | Switzerland . |
| 268335 | 3/1926 | United Kingdom . |

OTHER PUBLICATIONS

C. Pfleiderer & H. Peterman, 'Strömungsmaschinen', Springer–Verlag, Berlin, 1986, pp. 19 and 443.

Storek, H.: Neuere Konstrucktfonen kleinerer und mittelgroler Kaplanturbinen. In: Engergie, Jg. 5, Nr. 8 15. Aug. 1953, S.232–234.

Book by Petermann, "Turbo–Engines" on p. 19, Figure 1.2.2.2.

*Primary Examiner*—Edward K. Look
*Assistant Examiner*—Mark Sgantzos
*Attorney, Agent, or Firm*—Darby & Darby

[57] ABSTRACT

The invention relates to turbo-engine having a variable-pitch propeller. An adjustment spindle is disposed inside the shaft that carries the variable-pitch propeller. The adjustment spindle is connected to a step-down transmission, which is affixed in the area of the face side of the motor that drives the variable-pitch propeller or at a driven generator, and which interacts with an adjustment motor.

7 Claims, 4 Drawing Sheets

TURBO-ENGINE HAVING A VARIABLE PITCH PROPELLER

FIELD OF THE INVENTION

The present invention relates to a turbo-engine having a variable pitch propeller. More specifically, the present invention relates to a turbo-engine having a spindle to adjust the propeller blades.

BACKGROUND OF THE INVENTION

Various solutions for adjusting a variable pitch propeller of turbo-engines are known. In a book by Petermann, "Turbo-Engines" on page 19, FIG. 1.2.2.2, an adjustment gear transmission of a propeller pump is shown, which has a hollow drive shaft within which an axially longitudinally movable adjustment spindle transmits a force to the blades in a propeller head. The end of the drive shaft that is remote from the pump has slip-ring contacts, through which electrical power can be conducted to an electric motor integrated therein. The electric motor transfers its rotational speed and its torque to a step-down transmission connected to a spindle nut. The spindle nut is mounted axially and radially in the end of the pump shaft and transmits the rotary motion to an adjustment spindle. This proposed design requires a large amount of area and construction expense and has the disadvantage that the slip tings constitute a trouble spot for the transmission of electrical current.

JP59-176 498 discloses another proposed solution. The shaft is here constructed in parts, such that an electrical adjustment mechanism is integrated into a drive part of the shaft. A bearing for the rotor of the electric actuating drive is disposed at that end of the first shaft part which is remote from the propeller. The rotor bearing is disposed next to a coupling flange in such a way that it can move axially. By means of an adjoining external thread, the rotary motion of the motor can be converted into an axial motion. The axial motion of the rotor acts on a yoke situated inside the coupling of the two-part shaft, and transmits axial forces to a push rod disposed inside the first shaft part. Due to the overdimensioned long stator part and due to the thread which interacts with the rotor, the rotor moves axially inside the stator and creates the adjustment forces. However, this proposed solution is a very expensive design and exhibits high electric losses. The smallest external influences, such as dirt and the like, can jeopardize the function of this adjustment mechanism, because the sealing gap diameters are sometimes disposed on large diameters.

SUMMARY OF THE INVENTION

The present invention is based on the problem of developing a reliable, inexpensive, electric adjustment device for a variable-pitch propeller, such that the adjustment drive can have a small construction form and, if desired, can also be used within submersible turbo-engine units.

A commercial, high-speed, small standard motor can be used for the stationary mounted adjustment motor. This motor is a thoroughly developed and an economical product to use. In the case of a submersible motor-driven pump unit, for example, the adjustment motor can be installed without any problem into that end of the motor housing which is remote from the propeller and which in any case is designed to be fluid tight. Since the cable leads for the electric supply cables usually are also disposed in this area, the installation of the electrical cables also presents no problem. The fail-safe character of the adjustment device thus can be increased by a large factor. As one modification shows, this solution can also be integrated as an upgrade into an existing construction series.

Through the intermediate connection of an adapter housing, an adjustment motor affixed therein can easily be ranged to the motor or generator. The housing for the electrical connections can then again be disposed after this. The rotational speed can easily be reduced by connecting this adjustment motor to a likewise commercially available and proven step-down transmission. The adjustment mechanism may require a low rotational speed of the adjustment spindle, and this rotational speed thus can be transmitted very simply. The additional advantage of world-wide availability accrues by using a standard motor as the adjustment motor. In addition, the solution of the present invention makes it possible to adjust the blades even while the turbo-engine is at rest.

Another modification according to the present invention includes a coupling of a step-down transmission of the conventional type to the standardized adjustment motor in connection with an arrangement for a motor- or generator-part that is remote from the propeller. The shaft part associated therewith as well as the rotor shaft of the motor or generator itself are hollow, so as to accommodate the adjustment spindle for the variable-pitch propeller.

This solution makes the adjustment motor and the step-down transmission readily accessible. However, in this arrangement, the powerfully dimensioned adjustment spindle is also conducted through the rotor of the motor or generator. Consequently, this arrangement is recommended for large-dimensioned turbo-engine drives.

Another modification of the present invention, provides that the step-down transmission is disposed at that end of the motor or generator which is close to the propeller, and that the adjustment motor, which is affixed at that end of the motor or generator which is remote from the propeller, is connected to the transmission input through a drive shaft disposed in the hollow rotor shaft. In this embodiment, the transmission output is connected to an adjustment spindle. This solution does indeed require a somewhat greater expense in the area of the propeller shaft part, since this part must be designed to accommodate the step-down transmission in order to utilize the rotational speed of the adjustment motor. However, this mode of construction makes it possible to use a rotor shaft which has only a small hollow bore to accommodate a thin drive shaft. This solution is also suited for the use of submersible units. A drive concept is frequently used here in which a high-speed motor, through a subsequent transmission, produces a low shaft rpm. In an inverse sense, this applies to turbines. In such cases, the transmission is also equipped with a hollow shaft part through which the thin drive shaft passes. If the transmitted torques permit, a thicker adjustment spindle can also be brought through the transmission.

Another modification of the present invention advantageously provides that the step-down transmission be mounted inside a flange on the shaft. There is no restriction on the step-down transmissions that can be used. However, for reasons of space, designs with small dimensions are preferred.

Instead of acting on the step-down transmission, the motor can also act directly on an adjustment spindle, but in that case it must be designed so as to rotate slowly and must be capable of reversing its direction of rotation.

In principle, two types of designs are possible for the adjustment motor. It must be possible to brake the adjustment motor during operation, and the adjustment motor must rotate faster than the shaft, relative to the same direction of rotation. By means of these measures, the adjustment spindle can execute relative motions and thus can perform its adjustment function.

Another possibility provides for an adjustment motor which has at least two rotational speeds, both of which are faster or slower relative to the shaft rpm. This, too, can create a relative motion of the spindle, so as to activate an adjustment mechanism for the blade.

In the case where an adjustment motor with the same rotational speed but two different directions of rotation is used, an additional step-down transmission can be used for one direction of rotation, so as to obtain the same rotational speeds for an adjustment mechanism, if this should be necessary for the particular application.

It is also possible to operate the adjustment motor intermittently, because precise blade positions can be achieved by brief operation of the motor.

Embodiments of the invention are shown in the drawings and are described in more detail below.

BRIEF DESCRIPTION OF THE INVENTION

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PRESENTLY PREFERRED EMBODIMENT

Figure 1:
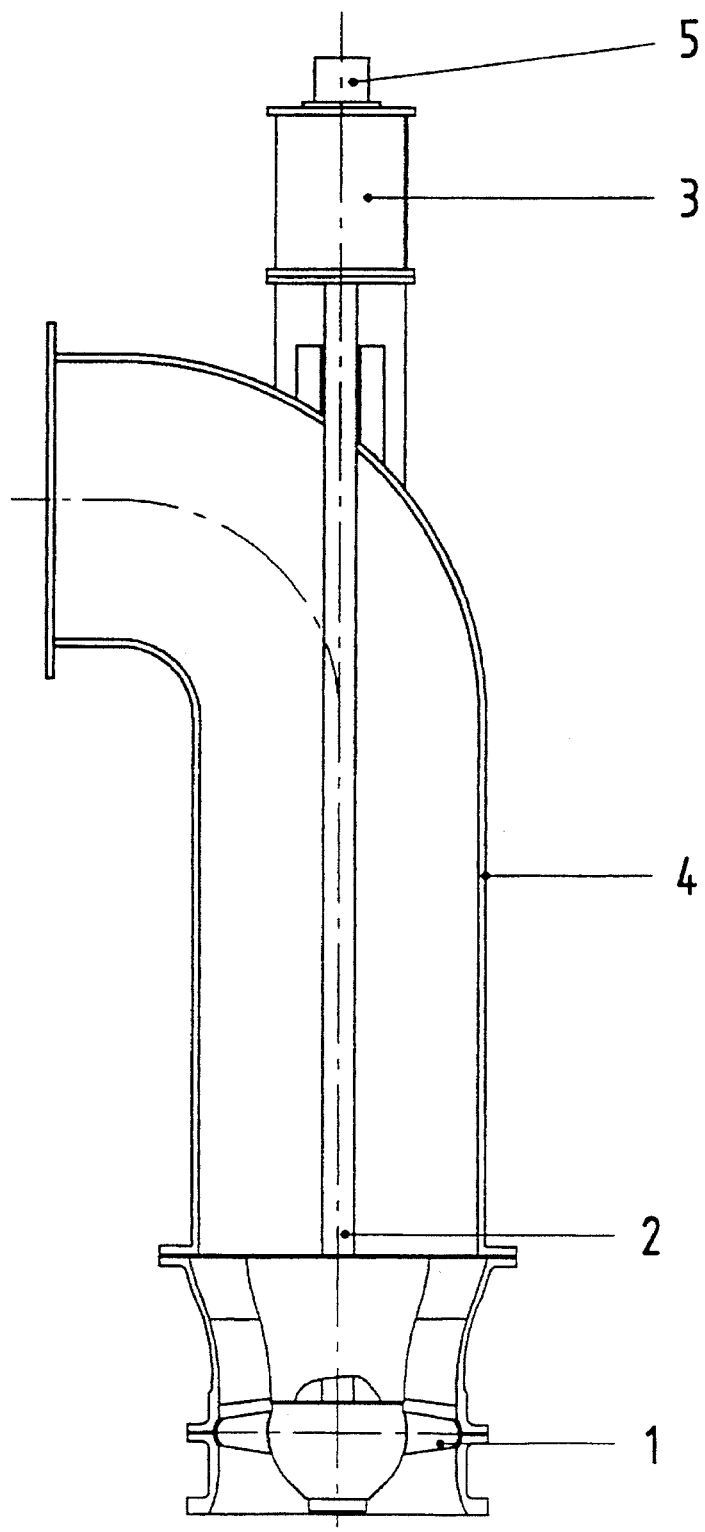
FIGS. 1 and 2 are schematic representations of turbo-engines.

Referring now to FIG. 1, a turbo-engine having a variable-pitch propeller is illustrated. This can be a turbine or a pump, a so-called tubular type pump, depending on the flow direction. The motor 3, which drives the variable-pitch propeller 1 by means of a shaft 2, and/or the generator driven by the motor, are disposed outside the transport medium. The shaft 2 here must penetrate through the housing 4. Art adjustment motor 5 is disposed at that end of the motor or generator 3 which is remote from the pump and is mounted to its housing in a simple manner.

Figure 2:
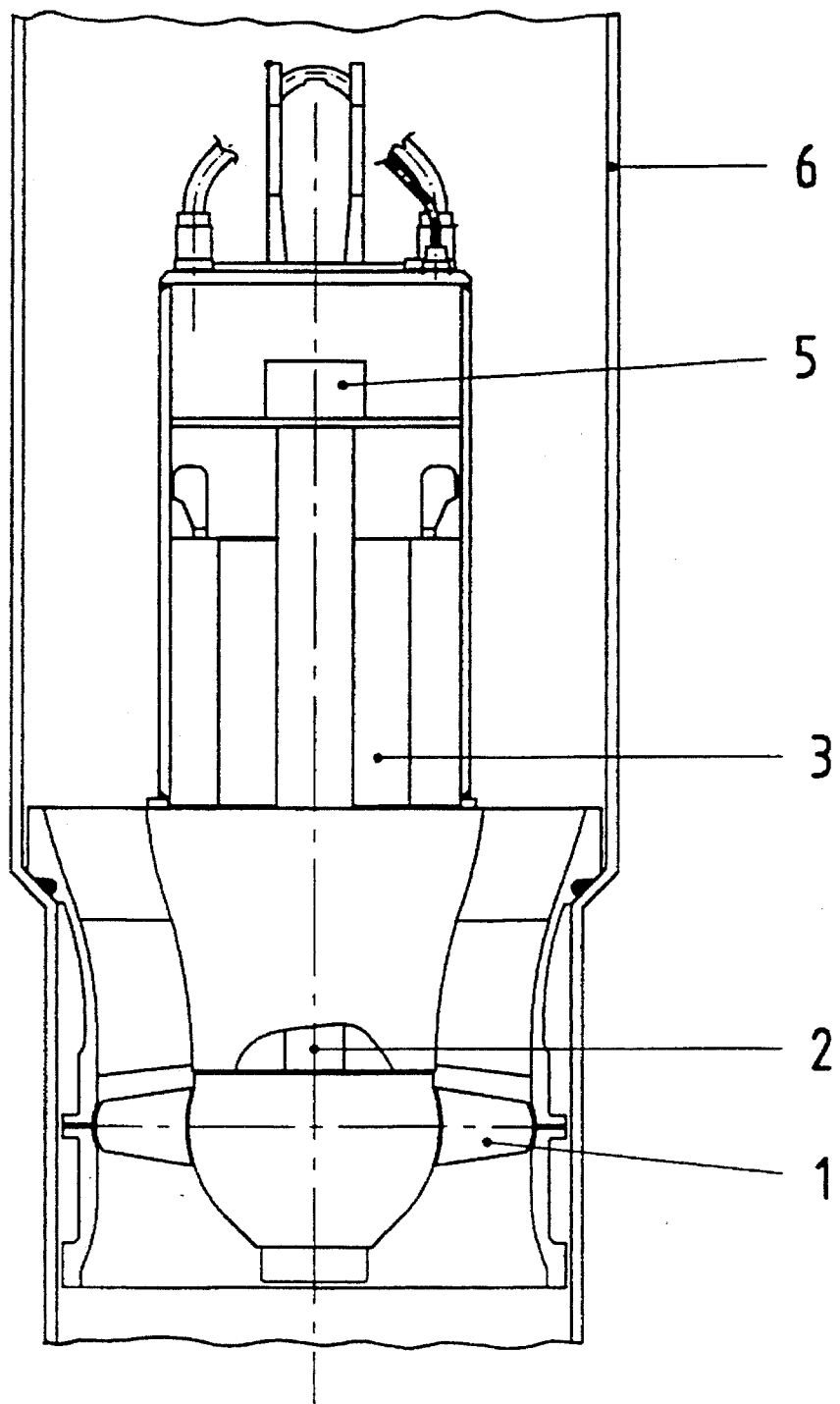

The turbo-engine, having a variable-pitch propeller is shown in FIG. 2 and corresponds to the example of a submersible motor-driven pump. The motor 3 is here disposed next to the variable-pitch propeller 1. The motor is thus situated within the transport medium, and the shaft 2 is quite short. This construction form has the advantage that the entire unit can quite economically be lowered directly into a shaft 6. Here, too, the adjustment motor 5 is disposed inside the housing of the motor 3. With flow reversal, this can involve a turbine aggregate.

Figure 3:
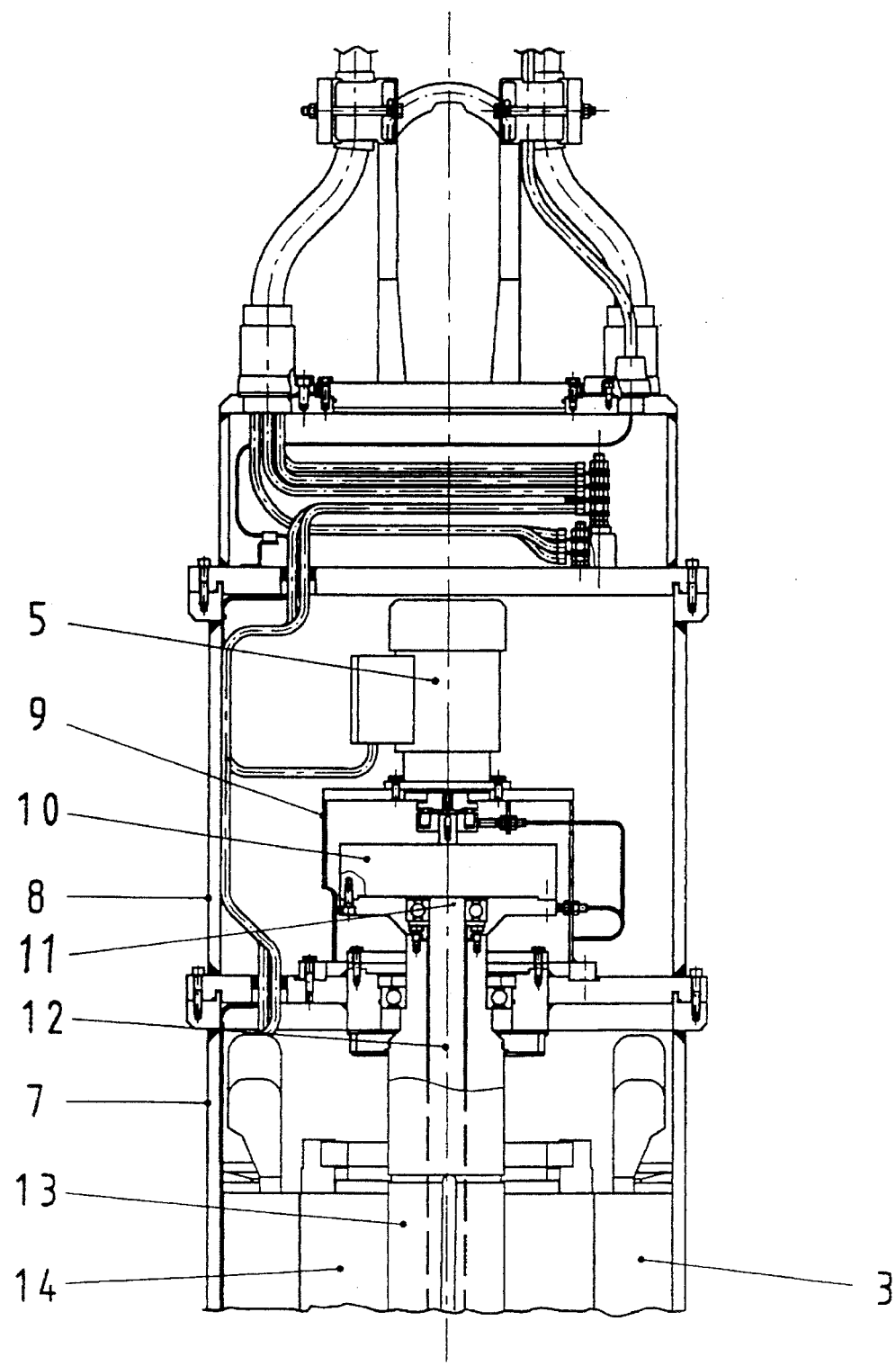
FIGS. 3 and 4 show two different arrangements of a step-down transmission, using a submersible motor-driven pump.

FIG. 3 shows a cutout of a housing 7 of the motor or generator 3, using a submersible unit as an example. An adapter housing 8 is disposed adjacent to housing 7. Within the adapter housing 8, the adjustment motor 5 is fastened op a side opening 9. The adjustment motor 5 is coupled to a step-down transmission 10, by means of which its high rotational speed is converted into a low rotational speed with a high torque. Conventional types of step-down transmissions can be used, such as cyclone-, slip wedge-, planetary-gears, and other similar forms. The output 11 of the transmission 10 is connected to an adjustment spindle 12, which transfers the adjustment torque to the variable-pitch propeller 1, which is not shown in FIG. 3. For this purpose, shaft 13 of the rotor 14 of the motor or generator 3 is hollow. The motor 3 itself can be a slow-speed motor, which directly drives the hollow shaft 13, or it can be a high-speed motor, which drives the hollow shaft indirectly through another step-down transmission (not shown in FIG. 3).

Figure 4:
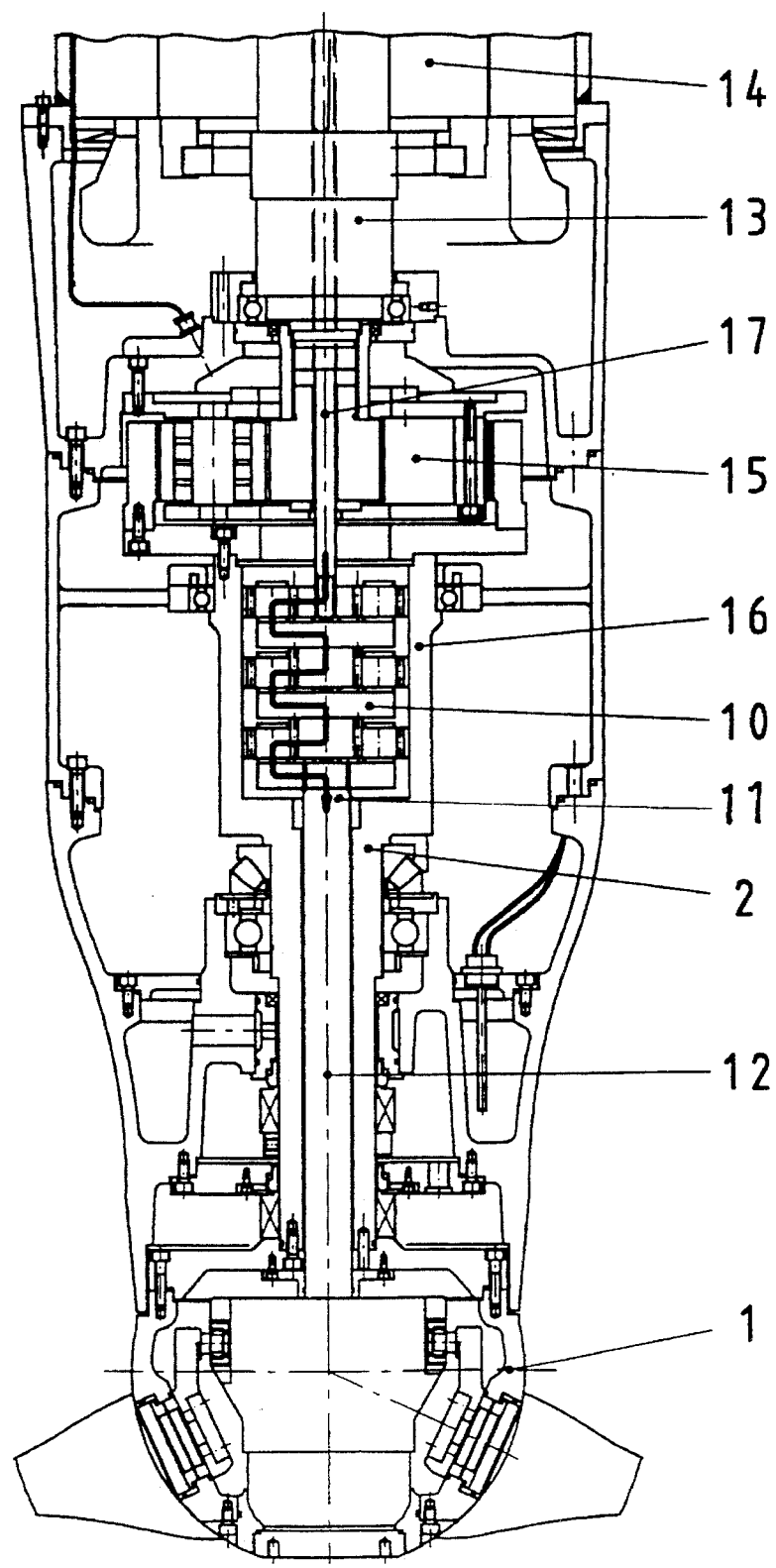

FIG. 4 shows an example of the latter embodiment. The shaft 13 of the rotor 14 is here connected to a step-down transmission 15. Shaft 2 is ranged through the output of the step-down transmission 15. Flange 16, of shaft 2, is hollow and at the same time accommodates a step-down transmission 10 of the adjustment device. A multi-speed planetary transmission is illustrated, but naturally other types of step-down transmissions can also be used.

From the step-down transmission 10, the adjustment spindle 12 extends through the hollow shaft 2 to the variable-pitch propeller 1. The force is transmitted from the adjustment motor 5, shown in FIG. 3, directly through the hollow shaft 13 of the rotor 14 by means of a thin drive shaft 17. This drive shaft also extends through the step-down transmission 15 of the shaft 2.

From the foregoing description, it will be appreciated that the present invention makes available, a compact, cost efficient turbo-engine having a variable pitch propeller arrangement.

Having described the presently preferred exemplary embodiment of a new and improved turbo-engine having a variable pitch propeller arrangement in accordance with the present invention, it is believed that other modifications, variations and changes will be suggested to those skilled in the art in view of the teachings set forth herein. It is, therefore, to be understood that all such variations, modifications, and changes are believed to fall within the scope of the present invention as defined by the appended claims.

What is claimed is:

1. A turbine assembly having a variable-pitch propeller for interacting with a fluid, and an adjustment mechanism that controls the pitch angle of the variable-pitch propeller, said turbine assembly comprising:

a drive motor having a hollow rotor shaft including a first end which is connected to said variable-pitch propeller and a second remote end which is disposed opposite to said first end;

an adjustment motor located adjacent to said second remote end of said hollow rotor shaft, said adjustment motor being disposed remote from said fluid; and an adjustment spindle rotatably located within said hollow shaft and being connected to both said shaft of said adjustment motor and said pitch angle adjustment mechanism so that rotation of said adjustment motor is transmitted through said hollow shaft to said adjustment mechanism to adjust the pitch angle of said propeller blades.

2. The turbine assembly of claim 1, further comprising a transmission having an input shaft which is connected to said adjustment spindle and a geared output shaft which is connected to said adjustment mechanism, said transmission altering the effective rotational speed between said input and said output shafts.

3. The turbine assembly of claim 2, wherein said transmission is located between said drive motor and said propeller.

4. The turbine assembly of claim 1, further comprising, a transmission having an input shaft which is connected to said shaft of said adjustment motor, and a geared output shaft which is connected to said adjustment spindle, said transmission altering the effective rotational speed between said input and said output shafts.

5. The turbine assembly of claim 4, wherein said transmission is located between said adjustment motor and said drive motor.

6. The turbine assembly of claim 2, wherein said transmission is mounted inside a flange on said hollow rotor shaft.

7. The turbine assembly of claim 6, wherein said adjustment motor and said transmission are affixed inside an adapter housing that is disposed on a side of said drive motor that corresponds to said second remote end of said hollow shaft.

* * * * *